United States Patent [19]

Christian et al.

[11] Patent Number: 4,811,825
[45] Date of Patent: Mar. 14, 1989

[54] DOG CLUTCH WITH LOCKING SYNCHRONIZATION

[75] Inventors: Klaus Christian, Immenstaad; Führer Gerd, Friedrichshafen, both of Fed. Rep. of Germany

[73] Assignee: Zahnradfabrik Friedrichshafen AG, Friedrichshafen, Fed. Rep. of Germany

[21] Appl. No.: 26,580
[22] PCT Filed: Jul. 17, 1986
[86] PCT No.: PCT/EP86/00422
§ 371 Date: Feb. 27, 1987
§ 102(e) Date: Feb. 27, 1987
[87] PCT Pub. No.: WO87/00595
PCT Pub. Date: Jan. 29, 1987

[30] Foreign Application Priority Data

Jul. 26, 1985 [WO] PCT Int'l Appl. ............... PCT/EP85/00376

[51] Int. Cl.⁴ ............................................. F16D 23/04
[52] U.S. Cl. ..................................... 192/53 F; 74/339
[58] Field of Search ................ 192/53 F, 53 R, 53 E; 74/339

[56] References Cited

FOREIGN PATENT DOCUMENTS

| 1284309 | 11/1968 | Fed. Rep. of Germany . |
| 1450825 | 6/1969 | Fed. Rep. of Germany . |
| 1906863 | 8/1970 | Fed. Rep. of Germany . |
| 1910884 | 9/1970 | Fed. Rep. of Germany . |
| 1500332 | 12/1972 | Fed. Rep. of Germany . |
| 01998 | 5/1985 | PCT Int'l Appl. . |
| 0900185 | 7/1962 | United Kingdom ............... 192/53 F |
| 1125946 | 9/1968 | United Kingdom . |
| 1159744 | 7/1969 | United Kingdom . |

*Primary Examiner*—Rodney H. Bonck
*Assistant Examiner*—Richard M. Lorence
*Attorney, Agent, or Firm*—Herbert Dubno; Ronald Lianides

[57] ABSTRACT

Dog clutch with locking synchronization for gear shifts, wherein a synchronizer body (1) and a gear (2) turning with a different rotational speed are coupled together form-lockingly with the aid of an axially displaceable, annularly shaped sliding sleeve (3) when synchronized, whereby an inner toothing (31) of the sliding sleeve (3) engages in one respective external toothing (11, 12) of the synchronizer body (1) and the gear (2) with a locking pin and or plunger (4) located between the synchronizer body (1) and the sliding sleeve (3), which in the uncoupled stage engage in a recess (32) on the inside of the sliding sleeve (3) and have axially displaceable compression surfaces (41) which cooperate with the compression surfaces (51) on the synchro ring (5, 6) arranged between synchronizer body (1) and the gear (2), whereby at least two synchro rings (5, 50; 6, 60) are mutually connected via entrainment devices (52, 520; 62, 620) and are in entrainment connection with the synchronizer body (1) in both circumferential directions and with circumferential play, and whereby friction surfaces (24) assigned to the gear (2) form together severally frictionally connected couplings, and that when out of synchronization, the axial movement of the sliding sleeve (3) is blocked via blocking (37, 66) whereby a recess (12) in the synchronizer body (1) receives a coupling element (7) with circumferential play, with which at least two synchro rings (5, 50; 6, 60) are mutually connected. Due to the coupling of the two synchro rings (5, 50), arranged one over the other, the friction torque of the lower synchro ring (50, 60) contributes to the increase of the locking moment, so that the pointing of the blocking teeth can be kept slimmer, improving the disengagement operation.

4 Claims, 2 Drawing Sheets

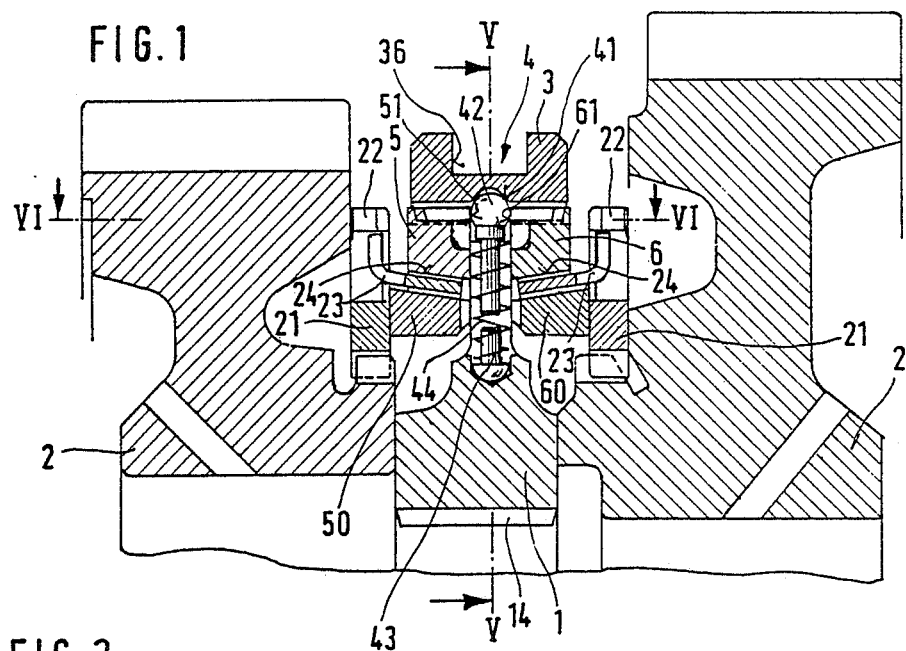
FIG. 1
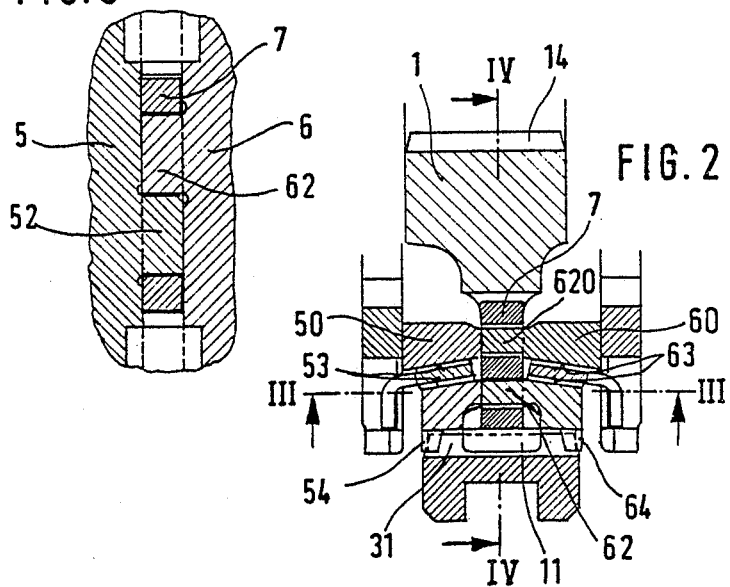
FIG. 3
FIG. 2

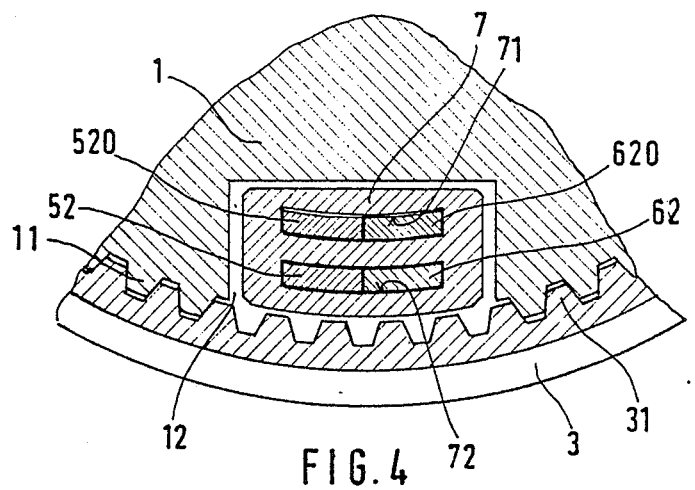
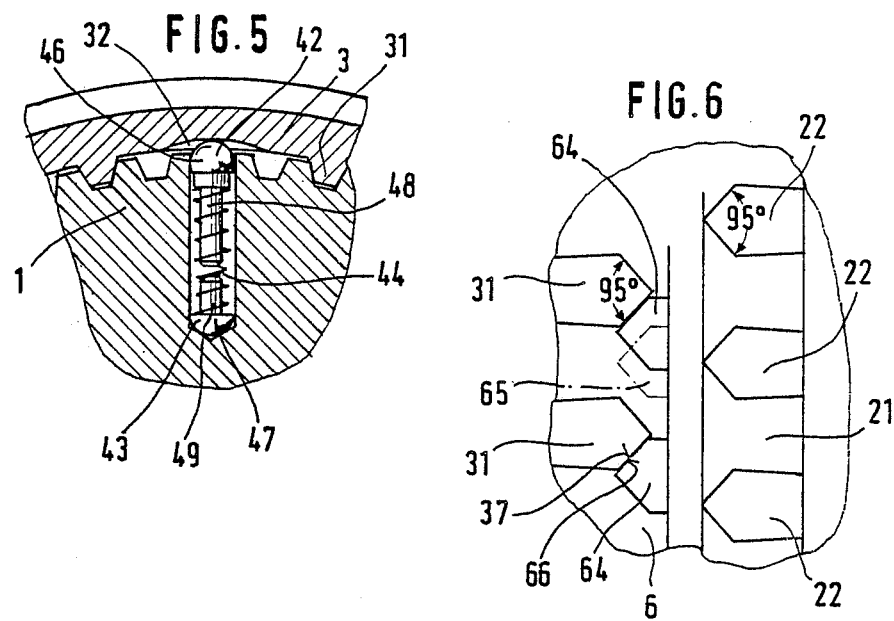

DOG CLUTCH WITH LOCKING SYNCHRONIZATION

FIELD OF THE INVENTION

This invention relates to a dog clutch with locking synchronization wherein a synchronizer body and a gear turning with different rotational speeds are coupled together form-lockingly with the aid of an axially displaceable, annular sliding sleeve when synchronized. In such synchronizers, an inner tooth array of the sliding sleeve engages in one respective outer tooth array of the synchronizer body and the gear. A locking pin and/or plunger is located between the synchronizer body and the sliding sleeve and in the uncoupled stage can engage in a recess on the inside of the sliding sleeve. The locking pin or plunger can have axially displaceable pressure surfaces, which cooperate with the pressure surfaces on a synchro ring arranged between the synchronizer body and the gear. At least two such synchro rings are connected to each other via entrainment devices and are in an entrainment connection with the synchronizer body in both circumferential directions and with circumferential play. Friction surfaces assigned to the gear form together several form-locking couplings with the friction surfaces of the synchro rings and the axial movements of the sliding sleeve are blocking via the blocking surfaces when out of synchronization.

BACKGROUND OF THE INVENTION

Dog clutches of this kind have to perform many, often counteracting tasks, as indicated in the article in MOTORRUNDSCHAU 20/64.

For instance, the synchronization of the coupling parts (gear and synchronizer body) running at different rotational speeds has to be achieved quickly and with a minimum of shift forces. Also, after synchronization, it has to insure an easy decoupling and a quick form-locking coupling, so that there is overall, a quicker and smoother functioning of the shifting process.

These requirements have to be satisfied with functionally simple means, which are also inexpensively manufactured.

One way to approach these objects is by increasing the number of friction surfaces, in order to obtain higher friction torque with reduced shift forces.

From the WO No. 85/01 998, a device is known wherein the friction surfaces of the frictional connection assigned to the gear are connected to the gear only in the active position. The synchronizer rings, arranged one over the other in radial direction, are also connected only to the synchronizer body with circumferential play and for the purpose of locking.

The German open application No. 14 50 825 shows that synchronizer rings can be connected to each other by gear couplings.

Such devices, due to the considerable increase of the friction surfaces, lead to a more rapid speed equilization with commensurate shift forces without overloading the friction surfaces, when compared to a simple friction pairing. However, the decoupling is not satisfactory, as a result of the blunt locking surfaces, which are required for secure locking and because the manufacturing efforts for such a device are too high.

OBJECT OF THE INVENTION

It is, therefore, an object of the present invention to provide a dog clutch which will achieve a generally smoother shifting process, including the unlocking, with relatively simple means, which can be inexpensively manufactured.

SUMMARY OF THE INVENTION

This object is attained by providing a recess of the synchronizer body in which a coupling element is arranged with circumferential play and with which at least two mutually interconnected synchro rings (5, 50; 6, 60) arranged one over the other in radial direction, are connected.

By providing a coupling element for the immediate connection between the two friction rings, whereby the friction torque of all friction pairings act upon the locking surface so that, for instance, the shift teeth can have a more pointed configuration at the shift sleeve, at the synchro ring and the gear, a more favorable disengagement is obtained. As a result of the high meshing moment, the cold shift limit is very high at relatively obtuse angles. It can, for instance, be lowered considerably from 15° C. at an angle of approximately 110° at the shift teeth to, for instance, 5° C., through the slimmer configuration of this angle.

The connection of the entrainment device between synchronizer body and synchronizer rings and the mutual coupling of the synchronizer rings, as well as the displacement in the area of the synchronizer body simplifies the construction and reduces manufacturing costs. Furthermore, the axial dimension of the dog clutch is reduced by the extent required for the gear clutch according to German open application No. 14 50 825, or the friction surfaces can be correspondingly widened, and thereby further enlarged. The individual construction components themselves, especially the synchro rings can also be significantly simplified due to the elimination of the coupling gearing for their mutual coupling.

The coupling element is stamped, sintered or ready cast and has a buckle-like shape. The dogs of the synchro rings which protrude axially towards the synchronizer body, engage in recesses of the coupling element. Two dog clutches can be arranged next to one another in the axial direction, and the coupling element can connect the synchro rings of both lock synchronization devices. In a recess arranged radially outwardly on the coupling element, the outer synchro rings can be connected to each other, while in the readily inner recess the inner synchro rings are mutually connected.

Due to the simple configuration of the coupling element, a correspondingly simple manufacuturing in processes such as stamping, casting or sintering, becomes possible. Special advantages exist in the case of double clutches, because the coupling elements for both clutches can be used, without requiring a significantly bigger effort.

BRIEF DESCRIPTION OF THE DRAWING

Further details of the invention are clarified with the aid of the drawing, in which:

FIG. 1 is a double dog clutch synchronizing device shown in section in the area of the plunger;

FIG. 2 is a partial section according to FIG. 1, but in the area of the coupling element;

FIG. 3 is a partial section taken along line III—III of FIG. 2;

FIG. 4 is a partial section taken along line IV—IV of FIG. 2 in the area of the coupling element;

FIG. 5 is a partial section taken along line V—V of FIG. 1, in the area of the plunger; and FIG. 6 is a section through a partially represented development in the area of the blocking teeth taken along line VI—VI of FIG. 1.

SPECIFIC DESCRIPTION

In the section through the double dog clutch according to FIG. 1, in the area of the plunger 4, and according to FIG. 2 in the area of the coupling element 7, the synchronizer body 1 is connected via splines 14 with a shaft (not shown); the gears 2 are also supported on the shaft. The respective coupling elements 21 with the coupling toothing 22 are connected to these gears. The sliding sleeve 3 is corotationally connected with the synchronizer body 1 via a toothing 11, 31 and, for instance, a divided plunger 42, 43 supported in the synchronizer body 1 and bearing in the recess 32 (FIG. 5) of the sliding sleeve 3. Between the upper part 42 and the lower part 43 of the plunger, a compression spring 44 is provided.

Axially interposed between the synchronizer body 1 and the coupling bodies 21, are synchro ring pairs, 5, 50 and 6, 60 with the respective friction rings 23 located therebetween and which are assigned to the coupling bodies 21 and, for instance, are corotationally connected thereto. The radially outer synchro rings 5, 6 carry also the blocking toothings 54, 64 and both synchro rings 5, 50 and 6, 60 in the case of a double clutch, are held via the dogs 62, 620 in respective recesses 71, 72 of the coupling element 7, as can be seen from FIG. 3, complementing FIG. 2. FIG. 4 shows the coupling element 7 with the engaged dogs 52, 520 and 62, 620 of the respective synchro rings 5, 50 and 6, 60, whereby the coupling element 7 is supported with circumferential play in a recess 12 of the synchronizer body 1. Suitably, three such recesses are distributed around the circumference. Also, three divided plungers 42, 43 are distributed around the circumference, for better functioning and, as shown in FIG. 5, are held between the synchronizer body 1 and a recess 32 of the sliding sleeve 3, whereby the upper part 42 and the lower part 43 of the plunger each consist of a ball end 46, 47 and a stem 48, 49 for the accommodation of the compression spring 44.

FIG. 6 shows the coupling teeth pointed at the respective frontal sides of one another, the coupling teeth 31 of the inner tooting of the sliding sleeve 3, the blocking teeth 64 of the synchro ring 6 and the coupling teeth 22 of the coupling body 21.

The dog clutch with locking synchronization operates as follows:

When initiating a shift, the slide ring of a shift fork (not shown in the drawing) received in the groove 36 of the sliding sleeve 3, for instance, moves to the right. By the pressure surfaces 41, and 51 or 61 on the ball end 46 of the plunger 4, the synchro rings 5 or 6 are brought into synchronization, so that in the case of rotational speed differences between the synchronizer body 1 and the gears 2, the synchro rings, and thereby the coupling element 7 are deflected in a circumferential direction (FIG. 4). The coupling element 7 comes to rest against one of the borders of recess 12 and the blocking teeth 64 of the synchro ring 6 rotate into the illustrated locking position (FIG. 6). The inner toothing of the sliding sleeve 3 prevents further displacement of the sliding sleeve 3 through contact of the blocking surfaces 37, 66 from both toothings. As a result of the engagement of both synchro rings 6, 60 in the coupling element 7, all friction pairings—friction surfaces 24, 53, 63—as well as both synchro rings 5, 50 and 6, 60 with the friction ring 23 become effective and bring about a high locking moment, so that the angle of the frontal bevelling at the coupling teeth 31, 22 and the blocking teeth 64 can be kept relatively slim, for instance at 90°–95°, and still be securely locked.

Only when equal rotational speed has been reached, the locking moment resulting from the difference in rotational speeds goes down to 0, and the shift pressure still exerted upon the sliding sleeve 3 can overcome the locking moment remaining from the mass inertia and the meshing, and the blocking teeth are shifted from the position 64 to the position 65. Thereby, the locking effect is eliminated and the inner toothing 31 of the sliding sleeve 3 can engage in the coupling toothing 22 of the coupling body 21. Between the synchronizer body 1 and the gear 2 a form-locking coupling has now been established.

This invention is not limited to the represented embodiment. It is also possible, for instance, not to provide blocking teeth on the synchro ring, but to provide instead blocking surfaces on the sliding sleeve, which act in cooperation with a locking pin and prevent the form-locking coupling of the synchronizer body and the gear, when out of synchronization. These locking surfaces can also be built with a slimmer angle.

We claim:

1. An apparatus consisting of a dog clutch and a locking synchronization device, said apparatus comprising:

an externally toothed synchronizer body rotatable about an axis;

a gear rotatable about said axis relative to said synchronizer body and alongside said synchronizer body;

a shifting ring having internal teeth engaged with the external teeth of said synchronizer body and rotatably entrained therewith while being axially shiftable relative to said body;

at least one radially biased pin mounted in said body, engageable in a recess formed internally of said shifting ring, and having a lateral pressure surface;

an outer synchro ring surrounded by said shifting ring and provided with blocking teeth engageable with said internal teeth of said shifting ring upon angular offset of said outer synchro ring and said shifting ring for blocking axial displacement of said shifting ring beyond a limited axial shift, said outer synchro ring being engaged by said lateral pressure surface upon said limited axial shift of said shifting ring;

an externally toothed element connected with said gear and adapted to receive said internal teeth to couple said gear with said shifting ring upon release of said internal teeth by said blocking teeth;

an inner synchro ring surrounded by said outer synchro ring;

a friction member rotationally coupled with said element and interposed between said synchro rings and frictionally engageable therewith upon said limited axial displacement of said shifting ring to synchronize the rotation of said gear with that of said synchro rings and said body; and a coupling element interconnecting said inner and outer synchro rings, received with limited circumferential play in a further recess formed in said body, enabling axial displacement of said synchro rings relative to said body, and rotationally coupling said synchro rings with said body.

2. The dog clutch defined in claim 1 wherein said coupling element has a pair of openings and each of said synchro rings has a respective dog receivable in a respective one of said openings.

3. The dog clutch defined in claim 2 wherein two such gears are provided, one on each side of said body and said shifting ring can be axially shifted selectively toward either of said gears for engagement with a respective said externally toothed element coupled rotationally to a respective said friction member between a respective pair of said inner and outer synchro rings, said coupling element also connecting both inner and both outer synchro rings by respective dogs thereof.

4. The dog clutch defined in claim 3 wherein dogs of said outer synchro rings are connected together in an outer one of said openings and dogs of said inner synchro rings are connected together in an inner one of said openings.

* * * * *